(12) United States Patent
Girard et al.

(10) Patent No.: US 12,467,003 B2
(45) Date of Patent: Nov. 11, 2025

(54) HYDROTREATING PROCESS USING A SEQUENCE OF CATALYST WITH A CATALYST BASED ON NICKEL, MOLYBDENUM AND TUNGSTEN

(71) Applicant: IFP ENERGIES NOUVELLES, Rueil-Malmaison (FR)

(72) Inventors: Etienne Girard, Rueil-Malmaison (FR); Anne-Sophie Gay, Rueil-Malmaison (FR); Isabelle Merdrignac, Rueil-Malmaison (FR); Antoine Daudin, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 108 days.

(21) Appl. No.: 18/275,478

(22) PCT Filed: Feb. 3, 2022

(86) PCT No.: PCT/EP2022/052517
§ 371 (c)(1),
(2) Date: Aug. 2, 2023

(87) PCT Pub. No.: WO2022/171508
PCT Pub. Date: Aug. 18, 2022

(65) Prior Publication Data
US 2024/0309278 A1   Sep. 19, 2024

(30) Foreign Application Priority Data

Feb. 9, 2021   (FR) ........................... 2101199

(51) Int. Cl.
| | | |
|---|---|---|
| *C10G 45/08* | (2006.01) |
| *B01J 21/04* | (2006.01) |
| *B01J 27/19* | (2006.01) |
| *B01J 35/61* | (2024.01) |
| *B01J 35/63* | (2024.01) |
| *B01J 35/64* | (2024.01) |
| *B01J 37/02* | (2006.01) |
| *B01J 37/20* | (2006.01) |
| *C10G 65/12* | (2006.01) |

(52) U.S. Cl.
CPC .............. *C10G 45/08* (2013.01); *B01J 21/04* (2013.01); *B01J 27/19* (2013.01); *B01J 35/615* (2024.01); *B01J 35/635* (2024.01); *B01J 35/647* (2024.01); *B01J 37/0203* (2013.01); *B01J 37/0205* (2013.01); *B01J 37/0236* (2013.01); *B01J 37/20* (2013.01); *C10G 65/12* (2013.01); *C10G 2300/1059* (2013.01)

(58) Field of Classification Search
CPC ...... B01J 21/04; B01J 23/883; B01J 23/8885; B01J 23/94; B01J 27/19; B01J 35/19; B01J 35/615; B01J 35/635; B01J 35/647; B01J 37/0201; B01J 37/0203; B01J 37/0205; B01J 37/0236; B01J 37/20; C10G 2300/1059; C10G 45/08; C10G 65/12; C10G 65/02
See application file for complete search history.

(56) References Cited

U.S. PATENT DOCUMENTS

| | | |
|---|---|---|
| 5,068,025 A | 11/1991 | Bhan |
| 7,816,299 B2 | 10/2010 | Schleicher et al. |
| 9,683,180 B2 | 6/2017 | Roy-Auberger et al. |
| 11,015,129 B2 | 5/2021 | Dubin et al. |
| 2003/0116473 A1 | 6/2003 | Koide et al. |
| 2011/0079542 A1 | 4/2011 | Ellis et al. |
| 2015/0144529 A1* | 5/2015 | Roy-Auberger ....... C10G 69/04 208/89 |
| 2015/0144533 A1 | 5/2015 | Roy-Auberger et al. |

FOREIGN PATENT DOCUMENTS

| | | |
|---|---|---|
| EP | 3722394 A1 | 10/2020 |
| FR | 3013720 A1 | 5/2015 |

OTHER PUBLICATIONS

International search report PCT/EP2022/052517 dated Apr. 11, 2022 (pp. 1-2).

* cited by examiner

*Primary Examiner* — Ellen M Mcavoy
*Assistant Examiner* — Chantel Graham
(74) *Attorney, Agent, or Firm* — Csaba Henter; MILLEN, WHITE, ZELANO & BRANIGAN

(57) ABSTRACT

A subject matter of the invention is a process for the hydrotreating of a hydrocarbon feedstock having a distillation range of between 150° C. and 600° C., so as to obtain a hydrotreated effluent, said process comprising the following stages:
 a) said hydrocarbon feedstock is brought into contact, in the presence of hydrogen, with at least one first catalyst occupying a volume V1 and comprising a support based on alumina or silica or silica-alumina and an active phase consisting of nickel and molybdenum,
 b) the effluent obtained in stage a) is brought into contact, in the presence of hydrogen, with at least one second catalyst occupying a volume V2 and comprising a support based on alumina or silica or silica-alumina and an active phase consisting of nickel, molybdenum and tungsten, and phosphorus,
the distribution of the volumes V1/V2 being of between 50% vol/50% vol and 90% vol/10% vol respectively.

11 Claims, No Drawings

HYDROTREATING PROCESS USING A SEQUENCE OF CATALYST WITH A CATALYST BASED ON NICKEL, MOLYBDENUM AND TUNGSTEN

TECHNICAL FIELD

The invention relates to a process for the hydrotreating of a hydrocarbon feedstock employing a sequence of at least two catalysts, the second catalyst of which is a catalyst based on nickel, molybdenum and tungsten. The objective of the process is the production of hydrodesulfurized, hydrodenitrogenated and/or hydrodearomatized feedstocks.

Conventional hydrotreating catalysts generally comprise an oxide support and an active phase based on metals from Groups VIb and VIII in their oxide forms and also on phosphorus. The preparation of these catalysts generally comprises a stage of impregnation of the metals and the phosphorus on the support, followed by drying and calcination making it possible to obtain the active phase in their oxide forms. Before their use in a hydrotreating and/or hydrocracking reaction, these catalysts are generally subjected to a sulfidation in order to form the active entity.

The addition of an organic compound to the hydrotreating catalysts in order to improve their activity has been recommended by a person skilled in the art, in particular for catalysts which have been prepared by impregnation followed by drying without subsequent calcination. These catalysts are often referred to as "additive-impregnated dried catalysts".

Usually, a catalyst for the hydrotreating of hydrocarbon cuts has the aim of removing the sulfur-based, nitrogen-based or aromatic compounds contained in them in order, for example, to make a petroleum product to the required specifications (sulfur content, aromatics content, and the like) for a given application (motor vehicle fuel, gasoline or gas oil, domestic fuel oil, jet fuel).

Due to the tightening of legislation with regard to the quality of the air in many countries, continuous efforts are being made to develop more effective catalysts and processes for the production of ultra low sulfur fuels, in particular diesel (ULSD). Although great progress has been made in the development of efficient catalysts for these processes, major challenges remain, for example their modest saturation activity for aromatic hydrocarbons. The improvement in the aromatic saturation activity of hydrotreating catalysts has become a research priority since recent environmental restrictions have established minimum values for the cetane number and lower limits for the polyaromatics contents in diesel cuts.

The fall in the sulfur, nitrogen and in particular aromatics content is also desired in the field of the pretreatment for a hydrocracking process or for a fluidized bed catalytic cracking process (or FCC (Fluid Catalytic Cracking) process) in order to improve the performance qualities in the subsequent hydrocracking or FCC stages. These processes generally treat feedstocks highly charged with sulfur, nitrogen and aromatics.

However, a hydrotreating catalyst optimized for hydrodesulfurization (HDS) is not automatically optimized for the saturation of aromatics (or hydrodearomatization HDA) or for hydrodenitrogenation (HDN), and vice versa. Recourse is thus often had to sequences of catalysts in which each catalyst is optimized for one hydrotreating type.

Such sequences of supported catalysts are, for example, described in the documents US2011/0079542, U.S. Pat. No. 5,068,025, CN1176290, FR 3 013 720 or FR 3 013 721.

There also exist sequences of unsupported catalysts, also referred to as "bulk" catalysts, and known, for example, from the documents U.S. Pat. No. 7,816,299 or CN102851070. However, the sequence of supported catalysts exhibits the advantage of using regenerable catalysts which are in addition less expensive (as containing lower charges of metals) and which are also active with a lower content of metals.

The document US2003/0116473 discloses a hydrotreating process using a sequence of a supported molybdenum-based catalyst followed by a supported tungsten-based catalyst. This document does not disclose the distribution by volume of the two catalytic regions.

The document CN105435824 discloses a hydrotreating process using a sequence of a supported CoMoP catalyst additivated with citric acid followed by a supported NiMoWP catalyst. The volume of the first catalyst is of between 5% and 95% and the volume of the second catalyst is of between 95% and 5%. An increase in HDS and in HDN is observed. Whatever the sequence of catalysts chosen, the modifications induced do not always make it possible to increase the performance qualities of the catalytic system sufficiently to meet the specifications concerning the sulfur, nitrogen and/or aromatics contents of fuels. Consequently, it emerges as essential, for refiners, to find novel hydrotreating processes having improved performance qualities in terms of activity and of stability.

The applicant company has developed a process for hydrotreating a hydrocarbon feedstock comprising bringing said feedstock into contact with a specific sequence of catalysts making it possible to increase the overall activity and the overall stability of the process.

SUMMARY

The present invention relates to a process for the hydrotreating of a hydrocarbon feedstock having a distillation range of between 150° C. and 600° C. at a temperature of between 180° C. and 450° C., a pressure of between 0.5 and 30 MPa, an hourly space velocity of between 0.1 and 20 $h^{-1}$ and a hydrogen/feedstock ratio, expressed as volume of hydrogen, measured under standard temperature and pressure conditions, per volume of liquid feedstock, of between 50 l/l and 5000 l/l, so as to obtain a hydrotreated effluent, said process comprising the following stages:
  a) a first hydrotreating stage carried out in a first hydrotreating reaction section, employing at least one catalytic bed comprising at least one first hydrotreating catalyst, said hydrotreating reaction section being fed by at least said hydrocarbon feedstock and a gas stream comprising hydrogen, said first catalyst comprising a support based on alumina or silica or silica-alumina and an active phase consisting of nickel and molybdenum,
  b) a second hydrotreating stage carried out in a second hydrotreating reaction section, employing at least one catalytic bed comprising at least one second hydrotreating catalyst, said hydrotreating reaction section being fed by at least a part of the effluent obtained in stage a), said second catalyst comprising a support based on alumina or silica or silica-alumina and an active phase consisting of nickel, molybdenum and tungsten, and phosphorus, said first hydrotreating reaction section containing the first catalyst occupying a volume V1 and said second hydrotreating reaction section containing the second catalyst occupying a volume V2, the distribution of the volumes V1/V2 being of between 50% vol/50% vol and 90% vol/10% vol respectively of said first and second hydrotreating reaction section.

The applicant company has discovered, surprisingly, that a sequence of a first hydrotreating reaction section containing the first catalyst based on an active phase consisting of nickel and molybdenum and of a second hydrotreating reaction section containing the second catalyst based on an active phase consisting of nickel, molybdenum and tungsten in the presence of phosphorus exhibits a synergistic effect in terms of activity and of stability in hydrotreating, in particular in hydrogenation of aromatics (HDA) but also in hydrodesulfurization (HDS) and/or in hydrodenitrogenation (HDN), when the respective volumes of the first and second hydrotreating reaction sections observe a certain distribution, in particular of between 50% vol/50% vol and 90% vol/10% vol respectively of said first and second hydrotreating reaction section.

This is because the symbiosis of the first bimetallic catalyst based on an active phase consisting of nickel and molybdenum, carrying out in particular the HDS and a part of the HDN, followed by the second trimetallic catalyst based on an active phase consisting of nickel, molybdenum and tungsten in the presence of phosphorus, carrying out in particular the HDA and the HDN, in a certain ratio makes it possible to obtain a catalytic sequence which is highly active and stable in order to obtain hydrocarbon cuts to the specifications.

On the one hand, the second catalyst is shown to be very active, in particular in HDA and HDN, which makes it possible to supplement the hydrotreating, in particular HDS and HDN, reactions of the first catalyst which are necessary in order to achieve the specifications. Typically, by virtue of the increase in the activity, the temperature required to achieve a desired sulfur, nitrogen or aromatics content (for example a maximum of 10 ppm of sulfur in the case of a gas oil feedstock, in ULSD or Ultra Low Sulfur Diesel mode, or also a content <8% by weight of polyaromatics and a cetane number >46 (summer) and 43-46 (winter)) may be lowered. Similarly, the stability is increased, since the cycle time is prolonged by virtue of the necessary temperature reduction.

On the other hand, the trimetallic catalyst is deactivated less rapidly than a bimetallic catalyst, which makes it possible all the more to increase the cycle time with regard to a standard feedstock or to make possible the treatment of feedstocks highly charged with sulfur, nitrogen and/or aromatics.

The distribution by volume of the two catalysts, in particular the fact that the second reaction section containing the second catalyst occupies a smaller volume than the first reaction section containing the first catalyst, makes it possible to optimize the HDS, HDN and HDA reactions carried out in the first or second reaction section in order to obtain hydrocarbon cuts to the specifications while increasing the activity and the stability of the catalytic system in comparison with a system containing only just one of the catalysts or a system containing the two catalysts with a distribution by volume outside the distribution of between 50% vol/50% vol and 90% vol/10% vol.

Another advantage of the hydrotreating process according to the invention is the fact that light feedstocks (gas oil) and heavier feedstocks (vacuum distillate) can equally well be treated. The hydrotreating process according to the invention is also particularly suitable for the hydrotreating of feedstocks comprising high contents of nitrogen and of aromatics, such as feedstocks resulting from catalytic cracking, from coking or from visbreaking.

The process according to the present invention makes it possible to produce a hydrotreated hydrocarbon cut, that is to say a cut simultaneously freed from nitrogen-based compounds, sulfur-based compounds and aromatic compounds. Preferably, according to the process according to the invention, the hydrodesulfurization (HDS) conversion is greater than 95%, preferably greater than 98%. Preferably, according to the process according to the invention, the hydrodenitrogenation (HDN) conversion is greater than 90%, preferably greater than 95%. Preferably, according to the process according to the invention, the hydrogenation of aromatics (HDA) conversion is greater than 70%, preferably greater than 80%.

According to an alternative form, the distribution of the volumes V1/V2 is of between 60% vol/40% vol and 85% vol/15% vol respectively of said first and second hydrotreating reaction section.

According to an alternative form, the distribution of the volumes V1/V2 is of between 70% vol/30% vol and 80% vol/20% vol respectively of said first and second hydrotreating reaction section.

According to an alternative form, the second catalyst is characterized in that:
the content of nickel, measured in the NiO form, is of between 1% and 4% by weight, with respect to the total weight of the catalyst,
the content of molybdenum, measured in the $MoO_3$ form, is of between 2% and 9% by weight, with respect to the total weight of the catalyst,
the content of tungsten, measured in the $WO_3$ form, is of between 18% and 40% by weight, with respect to the total weight of the catalyst,
the content of phosphorus, measured in the $P_2O_5$ form, is of between 0.5% and 4% by weight, with respect to the total weight of the catalyst.

According to an alternative form, the second catalyst is characterized in that:
the content of nickel, measured in the NiO form, is of between 3% and 4% by weight, with respect to the total weight of the catalyst,
the content of molybdenum, measured in the $MoO_3$ form, is of between 2% and 9% by weight, with respect to the total weight of the catalyst,
the content of tungsten, measured in the $WO_3$ form, is of between 29% and 40% by weight, with respect to the total weight of the catalyst,
the content of phosphorus, measured in the $P_2O_5$ form, is of between 3% and 4% by weight, with respect to the total weight of the catalyst.

According to an alternative form, the second catalyst is additionally characterized in that:
the molar ratio $WO_3/MoO_3$ is of between 2 and 12.4 mol/mol,
the molar ratio $NiO/(WO_3+MoO_3)$ is of between 0.20 and 0.33 mol/mol,
the molar ratio $P_2O_5/(WO_3+MoO_3)$ is of between 0.21 and 0.34 mol/mol.

According to an alternative form, the first catalyst has a molybdenum content of between 5% and 40% by weight, expressed as $MoO_3$, with respect to the total weight of the catalyst, and a nickel content of between 1% and 10% by weight, expressed as NiO, with respect to the total weight of the catalyst.

According to an alternative form, the first catalyst additionally comprises phosphorus at a content of between 0.1% and 20% by weight, expressed as $P_2O_5$, with respect to the total weight of the catalyst.

According to an alternative form, the first and/or the second catalyst additionally contains an oxygen- and/or nitrogen- and/or sulfur-containing organic compound.

According to an alternative form, the organic compound is chosen from a compound comprising one or more chemical functional groups chosen from a carboxyl, alcool, thiol, thioether, sulfone, sulfoxide, ether, aldehyde, ketone, ester, carbonate, amine, nitrile, imide, oxime, urea or amide functional group or also the compounds including a furan ring or also a sugar, and preferably it is chosen from γ-valerolactone, 2-acetylbutyrolactone, triethylene glycol, diethylene glycol, ethylene glycol, ethylenediaminetetraacetic acid (EDTA), maleic acid, malonic acid, citric acid, acetic acid, oxalic acid, gluconic acid, glucose, fructose, sucrose, sorbitol, xylitol, γ-ketovaleric acid, a di($C_1$-$C_4$ alkyl) succinate and more particularly dimethyl succinate, dimethylformamide, 1-methyl-2-pyrrolidinone, propylene carbonate, 2-methoxyethyl 3-oxobutanoate, bicine, tricine, 2-furaldehyde (also known under the name furfural), 5-hydroxymethylfurfural, 2-acetylfuran, 5-methyl-2-furaldehyde, ascorbic acid, butyl lactate, ethyl lactate, butyl butyryllactate, ethyl 3-hydroxybutanoate, ethyl 3-ethoxypropanoate, 2-ethoxyethyl acetate, 2-butoxyethyl acetate, 2-hydroxyethyl acrylate, 1-vinyl-2-pyrrolidinone, 1,3-dimethyl-2-imidazolidinone, 1,5-pentanediol, 1-(2-hydroxyethyl)-2-pyrrolidinone, 1-(2-hydroxyethyl)-2,5-pyrrolidinedione, 5-methyl-2(3H)-furanone, 1-methyl-2-piperidinone, 4-aminobutanoic acid, butyl glycolate, ethyl 2-mercaptopropanoate, ethyl 4-oxopentanoate, diethyl maleate, dimethyl maleate, dimethyl fumarate, diethyl fumarate, dimethyl adipate and dimethyl 3-oxoglutarate.

According to an alternative form, the content of organic compound is of between 1% and 30% by weight, with respect to the total weight of the catalyst.

According to an alternative form, the first and/or the second catalyst is at least partially sulfided.

According to an alternative form, the hydrotreating process is a process for the hydrodesulfurization (HDS) of a gas oil cut.

According to an alternative form, the hydrotreating process is carried out as pretreatment in a fluidized bed catalytic cracking process.

According to an alternative form, the hydrotreating process is carried out as pretreatment in a hydrocracking process.

DETAILED DESCRIPTION OF THE INVENTION

Definitions

Subsequently, the groups of chemical elements are given according to the CAS classification (CRC Handbook of Chemistry and Physics, published by CRC Press, editor-in-chief D. R. Lide, $81^{st}$ edition, 2000-2001). For example, Group VIII according to the CAS classification corresponds to the metals of Columns 8, 9 and 10 according to the new IUPAC classification.

The term "specific surface" is understood to mean the BET specific surface ($S_{BET}$ in $m^2/g$) determined by nitrogen adsorption in accordance with Standard ASTM D 3663-78 established from the Brunauer-Emmett-Teller method described in the journal "*The Journal of the American Chemical Society*", 1938, 60, 309.

Total pore volume of the catalyst or of the support used for the preparation of the catalyst is understood to mean the volume measured by mercury porosimetry intrusion according to Standard ASTM D4284-83 at a maximum pressure of 4000 bar (400 MPa), using a surface tension of 484 dynes/cm and a contact angle of 140°. The wetting angle was taken equal to 140° following the recommendations of the publication "Techniques de l'ingénieur, traité analyse et caractérisation" [Techniques of the Engineer, Analysis and Characterization Treatise], pages 1050-1055, written by Jean Charpin and Bernard Rasneur. In order to obtain better accuracy, the value of the total pore volume corresponds to the value of the total pore volume measured by mercury intrusion porosimetry measured on the sample minus the value of the total pore volume measured by mercury intrusion porosimetry measured on the same sample for a pressure corresponding to 30 psi (approximately 0.2 MPa).

The contents of metals from Group VIII and Group VIb are measured by X-ray fluorescence.

The contents of metal from Group VIb, of metal from Group VIII and of phosphorus are expressed as oxides after correction for the loss on ignition of the catalyst sample at 550° C. in a muffle furnace for two hours. The loss on ignition is due to the loss of moisture. It is determined according to ASTM D7348.

Hydrotreating is understood to mean reactions encompassing in particular hydrodesulfurization (HDS), hydrodenitrogenation (HDN) and hydrogenation of aromatics (HDA).

The Feedstock

The hydrocarbon feedstock to be treated according to the hydrotreating process of the invention exhibits a distillation range of between 150° C. and 600° C., preferably between 180° C. and 580° C.

The hydrocarbon feedstock can be of any chemical nature, that is to say have, apart from the content of aromatics which are described below, any distribution between the different chemical families chosen from paraffins, olefins and naphthenes.

The feedstocks employed in the hydrotreating process are, for example, gas oils, vacuum gas oils, atmospheric residues, vacuum residues, atmospheric distillates, vacuum distillates, heavy fuel oils, oils, waxes and paraffins, spent oils, deasphalted residues or crudes, feedstocks originating from thermal or catalytic conversion processes, lignocellulose feedstocks or, more generally, feedstocks resulting from biomass, such as vegetable oils, taken alone or as a mixture. The feedstocks which are treated, and in particular those mentioned above, generally contain heteroatoms, such as sulfur, oxygen and nitrogen, and, for heavy feedstocks, they usually also contain metals.

The aromatics content in the feedstock is greater than or equal to 20% by weight, preferably of between 25% and 90% by weight, more preferably between 30% and 80% by weight. The aromatics content is determined according to the method described in the publication Burdett R. A, Taylor L. W and Jones L. C, Journal of Molecular Spectroscopy, Rept. Conf., Inst. Petroleum, London, 1954, 30-41 (Pub. 1955).

The nitrogen content in the feedstock is greater than or equal to 150 ppm, preferably of between 200 and 10 000 ppm by weight, more preferably between 300 and 4000 ppm by weight.

The sulfur content in the feedstock is generally of between 0.01% and 5% by weight, preferably of between 0.2% and 4% by weight and more preferably still between 0.25% and 3% by weight.

Said hydrocarbon feedstock can optionally contain metals, in particular nickel and vanadium. The combined nickel and vanadium content of said hydrocarbon feedstock is preferably less than 50 ppm by weight, in a preferred way less than 25 ppm, more preferably still less than 10 ppm.

Said hydrocarbon feedstock can optionally contain asphaltenes. The asphaltenes content of said hydrocarbon feedstock is generally less than 3000 ppm, preferably less than 1000 ppm, more preferably still less than 200 ppm.

Said hydrocarbon feedstock can optionally contain resins. The resins content can be greater than 1% by weight, in particular greater than 5% by weight. The resins content is measured according to Standard ASTM D 2007-11. The hydrocarbon feedstock can also contain very little in the way of resins (less than 1% by weight)

According to one embodiment, said hydrocarbon feedstock is advantageously chosen from LCOs (Light Cycle Oil or light gas oils resulting from a catalytic cracking unit), atmospheric distillates, for example gas oils resulting from the direct distillation of crude oil or from conversion units, such as fluidized bed catalytic cracking, coking or visbreaking, or distillates originating from processes for the fixed bed or ebullated bed desulfurization or hydroconversion of atmospheric residues, or a mixture of said abovementioned feedstocks.

According to another embodiment, said hydrocarbon feedstock is advantageously chosen from HCOs (Heavy Cycle Oil (heavy gas oils resulting from a catalytic cracking unit)), vacuum distillates, for example gas oils resulting from the direct distillation of crude oil or from conversion units, such as catalytic cracking, coking or visbreaking, feedstocks originating from units for the extraction of aromatics, lubricating oil bases or resulting from the solvent dewaxing of lubricating oil bases, distillates originating from processes for the fixed bed or ebullated bed desulfurization or hydroconversion of atmospheric residues and/or vacuum residues and/or deasphalted oils, or the feedstock can be a deasphalted oil or comprise vegetable oils or else originate from the conversion of feedstocks resulting from biomass. Said hydrocarbon feedstock treated according to the hydrocracking process of the invention can also be a mixture of said abovementioned feedstocks.

The Implementation of the Process and the Operating Conditions

The process according to the invention can be carried out in one, two or more reactors. It is generally carried out in a fixed bed.

When the process according to the invention is carried out in two reactors, stage a) can be carried out in the first reactor containing the first reaction section traversed by the feedstock and then stage b) can be carried out in the second reactor containing the second reaction section, placed downstream of the first reactor. Optionally, the effluent from stage a) exiting from the first reactor can be subjected to a separation stage making it possible to separate a light fraction, containing in particular H$_2$S and NH$_3$ which are formed during the hydrotreating in stage a), from a heavy fraction containing the partially hydrotreated hydrocarbons. The heavy fraction obtained after the separation stage is subsequently introduced into the second reactor making it possible to carry out stage b) of the process according to the invention. The separation stage can be carried out by distillation, flash separation or any other method known to a person skilled in the art.

When the process is carried out in a single reactor, stage a) is carried out in a first region containing the first reaction section and stage b) is carried out in a second region containing the second reaction section downstream of the first region.

Said first hydrotreating reaction section containing the first catalyst occupies a volume V1 and said second hydrotreating reaction section containing the second catalyst occupies a volume V2, the distribution of the volumes V1/V2 being of between 50% vol/50% vol and 90% vol/10% vol, preferably of between 60% vol/40% vol and 85% vol/15% vol and particularly preferably of between 70% vol/30% vol and 80% vol/20% vol, respectively of said first and second hydrotreating reaction section.

The distribution by volume of the two catalysts, in particular the fact that the second reaction section containing the second catalyst occupies a smaller volume than the first reaction section containing the first catalyst, makes it possible to optimize the HDS, HDN and HDA reactions carried out in the first or the second reaction section. This is because an excessively large volume of the second catalyst does not make possible the quantitative breakdown of the nitrogen-based compounds, thus resulting in an inhibition of the HDA reaction. Conversely, an excessively small volume of second catalyst does not make it possible to maximize the HDA reaction.

The operating conditions used in stage a) or b) of the hydrotreating process according to the invention are generally as follows: the temperature is advantageously of between 180° C. and 450° C. and preferably between 250° C. and 440° C., the pressure is advantageously of between 0.5 and 30 MPa and preferably between 1 and 18 MPa, and the hourly space velocity is advantageously of between 0.1 and 20 h$^{-1}$ and preferably between 0.2 and 5 h$^{-1}$. The hourly space velocity (HSV) is defined here as the ratio of the hourly flow rate by volume of the hydrocarbon feedstock to the volume of catalyst(s). The hydrogen/feedstock ratio, expressed as volume of hydrogen, measured under standard temperature and pressure conditions, per volume of liquid feedstock, is advantageously of between 50 l/l and 5000 l/l and preferably 80 and 2000 l/l.

The operating conditions can be identical or different in stages a) and b). Preferably, they are identical.

Composition of the Catalysts Employed in the Invention

In accordance with the invention, the hydrotreating process employs a sequence of a first catalyst comprising a support based on alumina or silica or silica-alumina and an active phase consisting of nickel and molybdenum, and of a second catalyst comprising a support based on alumina or silica or silica-alumina and an active phase consisting of nickel, molybdenum and tungsten, and phosphorus.

First Catalyst

The first catalyst comprises a support based on alumina or silica or silica-alumina and an active phase consisting of nickel and molybdenum. It can additionally comprise phosphorus, an organic compound and optionally boron and/or fluorine.

The hydrogenating function of said first catalyst, also known as active phase, is provided by the nickel and the molybdenum.

Preferably, the total content of nickel and molybdenum is advantageously greater than 6% by weight, expressed as oxide, with respect to the total weight of the catalyst.

Preferably, the content of molybdenum, measured in the MoO$_3$ form, is of between 5% and 40% by weight, preferably between 8% and 39% by weight and more preferably between 10% and 38% by weight, with respect to the total weight of the catalyst.

Preferably, the content of nickel, measured in the NiO form, is of between 1% and 10% by weight, preferably between 1.5% and 9% by weight and more preferably between 2% and 8% by weight, with respect to the total weight of the catalyst.

Preferably, the nickel to molybdenum molar ratio in the first catalyst is preferentially of between 0.1 and 0.8, preferably of between 0.15 and 0.6 and more preferably still of between 0.2 and 0.5.

The first catalyst can also comprise phosphorus as dopant. The dopant is an added element which in itself does not exhibit any catalytic nature but which increases the catalytic activity of the active phase.

The content of phosphorus in said catalyst, measured in the $P_2O_5$ form, is of between 0.1% and 20% by weight, with respect to the total weight of the catalyst, preferably between 0.2% and 15% by weight and very preferably between 0.3% and 11% by weight, expressed as $P_2O_5$.

The phosphorus to molybdenum molar ratio in the first catalyst is greater than or equal to 0.05, preferably greater than or equal to 0.07, preferably of between 0.08 and 1, preferably of between 0.1 and 0.9 and very preferably of between 0.15 and 0.8.

The first catalyst can advantageously also contain at least one dopant chosen from boron, fluorine and a mixture of boron and fluorine.

When the catalyst contains boron or fluorine or a mixture of boron and fluorine, the content of boron or of fluorine or of mixture of the two is preferably of between 0.1% and 10% by weight, expressed as boron oxide and/or as fluorine element, with respect to the total weight of the catalyst, preferably between 0.2% and 7% by weight and very preferably of between 0.2% and 5% by weight.

The pore volume of said catalyst is generally of between 0.1 cm$^3$/g and 1.5 cm$^3$/g, preferably of between 0.15 cm$^3$/g and 1.1 cm$^3$/g. The total pore volume is measured by mercury porosimetry according to Standard ASTM D4284 with a wetting angle of 140°, as described in the work by Rouquerol F., Rouquerol J. and Singh K., *Adsorption by Powders & Porous Solids: Principle, Methodology and Applications*, Academic Press, 1999, for example by means of an Autopore III™ model machine of the Micromeritics™ brand.

The first catalyst is characterized by a specific surface of between 5 and 400 m$^2$/g, preferably of between 10 and 350 m$^2$/g, preferably of between 40 and 350 m$^2$/g, very preferably of between 50 and 300 m$^2$/g. The specific surface is determined in the present invention by the BET method according to Standard ASTM D3663, which method is described in the same work cited above.

The support of the first catalyst comprises, and preferably consists of, an alumina or a silica or a silica-alumina.

When the support of said catalyst is based on alumina, it contains more than 50% by weight of alumina, with respect to the total weight of the support, and in general it contains only alumina or silica-alumina as defined below.

Preferably, the support comprises alumina and preferably extruded alumina. Preferably, the support consists of gamma alumina.

The alumina support advantageously exhibits a total pore volume of between 0.1 and 1.5 cm$^3 \cdot g^{-1}$, preferably between 0.4 and 1.1 cm$^3 \cdot g^{-1}$. The total pore volume is measured by mercury porosimetry according to Standard ASTM D4284 with a wetting angle of 140°, as described in the work by Rouquerol F., Rouquerol J. and Singh K., *Adsorption by Powders & Porous Solids: Principle, Methodology and Applications*, Academic Press, 1999, for example by means of an Autopore III™ model machine of the Micromeritics™ brand.

The specific surface of the alumina support is advantageously of between 5 and 400 m$^2 \cdot g^{-1}$, preferably between 10 and 350 m$^2 \cdot g^{-1}$, more preferably between 40 and 350 m$^2 \cdot g^{-1}$. The specific surface is determined in the present invention by the BET method according to Standard ASTM D3663, which method is described in the same work cited above.

In another preferred case, the support of said catalyst is a silica-alumina containing at least 50% by weight of alumina, with respect to the total weight of the support. The silica content in the support is at most 50% by weight, with respect to the total weight of the support, generally less than or equal to 45% by weight, preferably less than or equal to 40%.

Sources of silicon are well known to a person skilled in the art. Mention may be made, by way of example, of silicic acid, silica in the powder form or in the colloidal form (silica sol), or tetraethyl orthosilicate Si(OEt)$_4$.

When the support for said catalyst is based on silica, it contains more than 50% by weight of silica, with respect to the total weight of the support, and, generally, it contains only silica.

According to a particularly preferred alternative form, the support consists of alumina, silica or silica-alumina.

In addition, the support can also advantageously contain a zeolite. In this case, any source of zeolite and any associated preparation method known to a person skilled in the art can be incorporated. Preferably, the zeolite is chosen from the group FAU, BEA, ISV, IWR, IWW, MEI, UWY and preferably the zeolite is chosen from the group FAU and BEA, such as zeolite Y and/or beta zeolite, and particularly preferably such as USY and/or beta zeolite. When the zeolite is present, its content is of from 0.1% to 50% by weight, with respect to the total weight of the support.

The support is advantageously provided in the form of beads, extrudates, pellets or irregular and nonspherical agglomerates, the specific shape of which can result from a crushing stage.

The first catalyst can additionally comprise an organic compound or a group of organic compounds known for their role of additives. The function of the additives is to increase the catalytic activity in comparison with nonadditivated catalysts. More particularly, the catalyst can additionally comprise one or more oxygen-containing organic compounds and/or one or more nitrogen-containing organic compounds and/or one or more sulfur-containing organic compounds. Preferably, the catalyst can additionally comprise one or more oxygen-containing organic compounds and/or one or more nitrogen-containing organic compounds. Preferably, the organic compound contains at least two carbon atoms and at least one oxygen and/or nitrogen atom, without containing other heteroatoms.

Generally, the organic compound is chosen from a compound comprising one or more chemical functional groups chosen from a carboxyl, alcohol, thiol, thioether, sulfone, sulfoxide, ether, aldehyde, ketone, ester, carbonate, amine, nitrile, imide, oxime, urea or amide functional group or also compounds including a furan ring or also a sugar.

The oxygen-containing organic compound can be one or more chosen from compounds comprising one or more chemical functional groups chosen from a carboxyl, alcohol, ether, aldehyde, ketone, ester or carbonate functional group or also compounds including a furan ring or also sugars. An oxygen-containing organic compound is understood here to mean a compound not comprising another heteroatom. By way of example, the oxygen-containing organic compound can be one or more chosen from the group consisting of ethylene glycol, diethylene glycol, triethylene glycol, a polyethylene glycol (with a molecular weight of between 200 and 1500 g/mol), propylene glycol, 2-butoxyethanol, 2-(2-butoxyethoxy)ethanol, 2-(2-methoxyethoxy)ethanol, triethylene glycol dimethyl ether, glycerol, acetophenone, 2,4-pentanedione, pentanone, acetic acid, oxalic acid, maleic acid, malic acid, malonic acid, gluconic acid, tartaric acid, citric acid, γ-ketovaleric acid, a di($C_1$-$C_4$ alkyl) succinate and more particularly dimethyl succinate, methyl acetoacetate, ethyl acetoacetate, 2-methoxyethyl 3-oxobutanoate, 2-methacryloyloxyethyl 3-oxobutanoate, dibenzofuran, a crown ether, orthophthalic acid, glucose, fructose, sucrose, sorbitol, xylitol, γ-valerolactone, 2-acetylbutyrolactone, propylene carbonate, 2-furaldehyde (also known under the name furfural), 5-hydroxymethylfurfural (also known under the name 5-(hydroxymethyl)-2-furaldehyde or 5-HMF), 2-acetylfuran, 5-methyl-2-furaldehyde, methyl 2-furoate, furfuryl alcohol (also known under the name furfuranol), furfuryl acetate, ascorbic acid, butyl lactate, ethyl lactate, butyl butyryllactate, ethyl 3-hydroxybutanoate, ethyl 3-ethoxypropanoate, methyl 3-methoxypropanoate, 2-ethoxyethyl acetate, 2-butoxyethyl acetate, 2-hydroxyethyl acrylate, 2-hydroxyethyl methacrylate, 1,5-pentanediol, 3-methyl-1,5-pentanediol, 1,5-hexanediol, 3-ethyl-1,5-pentanediol, 2,4-diethyl-1,5-pentanediol, 5-methyl-2 (3H)-furanone, butyl glycolate, ethyl 4-oxopentanoate, diethyl maleate, dimethyl maleate, dimethyl fumarate, diethyl fumarate, dimethyl adipate, dimethyl 3-oxoglutarate, dimethyl tartrate, diethyl tartrate, diisopropyl tartrate, di(tert-butyl) tartrate, dimethyl malate, diethyl malate, diisopropyl malate and dibutyl malate.

The nitrogen-containing organic compound can be one or more chosen from compounds comprising one or more chemical functional groups chosen from an amine or nitrile functional group. A nitrogen-containing organic compound is understood here to mean a compound not comprising another heteroatom. By way of example, the nitrogen-containing organic compound can be one or more chosen from the group consisting of ethylenediamine, diethylenetriamine, hexamethylenediamine, triethylenetetramine, tetraethylenepentamine, pentaethylenehexamine, acetonitrile, octylamine, guanidine and a carbazole.

The oxygen- and nitrogen-containing organic compound can be one or more chosen from compounds comprising one or more chemical functional groups chosen from a carboxyl, alcohol, ether, aldehyde, ketone, ester, carbonate, amine, nitrile, imide, amide, urea or oxime functional group. An oxygen- and nitrogen-containing organic compound is understood here to mean a compound not comprising another heteroatom. By way of example, the oxygen- and nitrogen-containing organic compound can be one or more chosen from the group consisting of 1,2-cyclohexanediaminetetraacetic acid, monoethanolamine (MEA), 1-methyl-2-pyrrolidinone, dimethylformamide, ethylenediaminetetraacetic acid (EDTA), alanine, glycine, nitrilotriacetic acid (NTA), N-(2-hydroxyethyl)ethylenediamine-N, N',N'-triacetic acid (HEDTA), diethylenetriaminepentaacetic acid (DTPA), tetramethylurea, glutamic acid, dimethylglyoxime, bicine, tricine, 2-methoxyethyl cyanoacetate, 1-ethyl-2-pyrrolidinone, 1-vinyl-2-pyrrolidinone, 1,3-dimethyl-2-imidazolidinone, 1-(2-hydroxyethyl)-2-pyrrolidinone, 1-(2-hydroxyethyl)-2,5-pyrrolidinedione, 1-methyl-2-piperidinone, 1-acetyl-2-azepanone, 1-vinyl-2-azepanone and 4-aminobutanoic acid.

The sulfur-containing organic compound can be one or more chosen from compounds comprising one or more chemical functional groups chosen from a thiol, thioether, sulfone or sulfoxide functional group. By way of example, the sulfur-containing organic compound can be one or more chosen from the group consisting of thioglycolic acid, 2,2'-thiodiethanol, 2-hydroxy-4-methylthiobutanoic acid, a sulfone derivative of a benzothiophene or a sulfoxide derivative of a benzothiophene, ethyl 2-mercaptopropanoate, methyl 3-(methylthio)propanoate and ethyl 3-(methylthio) propanoate.

Preferably, the organic compound contains oxygen; preferably, it is chosen from γ-valerolactone, 2-acetylbutyrolactone, triethylene glycol, diethylene glycol, ethylene glycol, ethylenediaminetetraacetic acid (EDTA), maleic acid, malonic acid, citric acid, acetic acid, oxalic acid, gluconic acid, glucose, fructose, sucrose, sorbitol, xylitol, γ-ketovaleric acid, a di($C_1$-$C_4$ alkyl) succinate and more particularly dimethyl succinate, dimethylformamide, 1-methyl-2-pyrrolidinone, propylene carbonate, 2-methoxyethyl 3-oxobutanoate, bicine, tricine, 2-furaldehyde (also known under the name furfural), 5-hydroxymethylfurfural (also known under the name 5-(hydroxymethyl)-2-furaldehyde or 5-HMF), 2-acetylfuran, 5-methyl-2-furaldehyde, ascorbic acid, butyl lactate, ethyl lactate, butyl butyryllactate, ethyl 3-hydroxybutanoate, ethyl 3-ethoxypropanoate, 2-ethoxyethyl acetate, 2-butoxyethyl acetate, 2-hydroxyethyl acrylate, 1-vinyl-2-pyrrolidinone, 1,3-dimethyl-2-imidazolidinone, 1,5-pentanediol, 1-(2-hydroxyethyl)-2-pyrrolidinone, 1-(2-hydroxyethyl)-2,5-pyrrolidinedione, 5-methyl-2(3H)-furanone, 1-methyl-2-piperidinone, 4-aminobutanoic acid, butyl glycolate, ethyl 2-mercaptopropanoate, ethyl 4-oxopentanoate, diethyl maleate, dimethyl maleate, dimethyl fumarate, diethyl fumarate, dimethyl adipate and dimethyl 3-oxoglutarate.

When it/they is/are present, the total content of oxygen- and/or nitrogen- and/or sulfur-containing organic compound(s) present in the catalyst is generally of between 1% and 30% by weight, preferably between 1.5% and 25% by weight and more preferably between 2% and 20% by weight, with respect to the total weight of the catalyst.

During the preparation of the catalyst requiring a drying stage, the drying stage(s) consecutive to the introduction of the organic compound is (are) carried out at a temperature of less than 200° C., so as to retain preferably at least 30%, preferably at least 50% and very preferably at least 70% of the amount of the organic compound introduced, calculated on the basis of the carbon remaining on the catalyst. The remaining carbon is measured by elemental analysis according to ASTM D5373.

Second Catalyst

In accordance with the invention, the second catalyst comprises a support based on alumina or silica or silica-alumina and an active phase consisting of nickel, molybdenum and tungsten. The second catalyst according to the invention also comprises phosphorus as dopant. It can additionally comprise an organic compound and/or optionally boron and/or fluorine.

The hydrogenating function of said second catalyst, also known as active phase, is constituted of nickel, molybdenum and tungsten.

The second catalyst is characterized in that:
the content of nickel, measured in the NiO form, is of between 1% and 4% by weight, with respect to the total weight of the catalyst,
the content of molybdenum, measured in the $MoO_3$ form, is of between 2% and 9% by weight, with respect to the total weight of the catalyst,
the content of tungsten, measured in the $WO_3$ form, is of between 18% and 40% by weight, with respect to the total weight of the catalyst, the content of phosphorus, measured in the $P_2O_5$ form, is of between 0.5% and 4% by weight, with respect to the total weight of the catalyst.

Preferably, the second catalyst is characterized in that:

the content of nickel, measured in the NiO form, is of between 3% and 4% by weight, with respect to the total weight of the catalyst, preferably between 3.1% and 3.9% by weight and more preferably between 3.2% and 3.8% by weight, the content of molybdenum, measured in the $MoO_3$ form, is of between 2% and 9% by weight, with respect to the total weight of the catalyst, preferably between 2% and 4% by weight, preferably between 2.2% and 3.8% by weight and more preferably between 2.5% and 3.5% by weight, the content of tungsten, measured in the $WO_3$ form, is of between 29% and 40% by weight, with respect to the total weight of the catalyst, preferably between 34% and 40% by weight, preferably between 35% and 39.9% by weight and more preferably between 36% and 39% by weight, the content of phosphorus, measured in the $P_2O_5$ form, is preferably of between 3% and 4% by weight, with respect to the total weight of the catalyst, preferably between 3.1% and 3.9% by weight and very preferably between 3.2% and 3.8% by weight.

Preferably, the $WO_3/MoO_3$ molar ratio is of between 2 and 12.4 mol/mol, preferably 5.3 and 12.4 mol/mol, preferably of between 5.7 and 11.1 mol/mol and more preferably still of between 6.4 and 9.7 mol/mol.

Preferably, the $NiO/(WO_3+MoO_3)$ molar ratio is of between 0.20 and 0.33 mol/mol, preferably of between 0.21 and 0.31 mol/mol and more preferably still of between 0.22 and 0.30 mol/mol.

Preferably, the $P_2O_5/(WO_3+MoO_3)$ molar ratio is of between 0.21 and 0.34 mol/mol, preferably of between 0.22 and 0.33 mol/mol and more preferably still of between 0.23 and 0.32 mol/mol.

The catalyst based on an active phase consisting of nickel, molybdenum and tungsten in the presence of phosphorus, which are deposited on a support, and exhibiting the specific ratios between the different metals and/or phosphorus which are described above, exhibits, by a synergistic effect, an excellent hydrotreating activity and stability, in particular in the hydrogenation of aromatics (HDA) but also in hydrodesulfurization (HDS) and/or in hydrodenitrogenation (HDN).

Without wishing to be committed to any one theory, an optimization of the content of each metal and of phosphorus using specific ratios would make it possible to obtain an active phase bringing about an improvement in the catalytic performance qualities. This is because tungsten is known to be more active in the hydrogenation of aromatics than molybdenum; however, its sulfidation is more difficult. The proximity of molybdenum in the active phase containing tungsten and the increase in the $WO_3/MoO_3$ ratio make it possible to improve the sulfidability of the tungsten and the catalytic performance qualities observed, up to a certain $WO_3/MoO_3$ ratio where the molybdenum content is too low to influence the sulfidability of the tungsten. Thus, the optimization of the $WO_3/MoO_3$ ratio, in combination with the optimized $NiO/(WO_3+MoO_3)$ and $P_2O_5/(WO_3+MoO_3)$ ratios, makes it possible to obtain a catalyst which is very active and stable in hydrotreating, in particular in the hydrogenation of aromatics (HDA).

The trimetallic catalyst having the specific ratios mentioned above is thus particularly preferred during a sequence with said first bimetallic catalyst upstream.

In addition, the catalyst exhibits a density of metals from Group VIb (Mo+W), expressed as number of atoms of said metals per unit area of the catalyst, which is of between 5 and 12 atoms of metals from Group VIb per $nm^2$ of catalyst, preferably of between 6 and 11, more preferably still of between 7 and 10. The density of metals from Group VIb, expressed as number of atoms of metals from Group VIb per unit area of the catalyst (number of atoms of metals from Group VIb per $nm^2$ of catalyst), is calculated, for example, from the following relationship:

$$d(\text{metal from Group VIb}) = \frac{\left(\frac{X_{Mo}}{M_{Mo}} + \frac{X_W}{M_W}\right) \times N_A}{100 \times 10^{18} \times S}$$

with:
$X_{Mo}$=% by weight of molybdenum;
$X_W$=% by weight of tungsten;
$N_A$=Avogadro's number, equal to $6.022 \times 10^{23}$;
S=Specific surface of the catalyst ($m^2/g$), measured according to Standard ASTM D3663;
$M_{Mo}$=molar mass of molybdenum;
$M_W$=molar mass of tungsten.

By way of example, if the catalyst contains 3% by weight of molybdenum oxide $MoO_3$ (i.e. 2.0% by weight of Mo) and 29.3% by weight of tungsten oxide and has a specific surface of 122 $m^2/g$, the density d(Mo+W) is equal to:

$$d(Mo+W) = \frac{\left(\frac{2.0}{95.94} + \frac{29.3}{183.84}\right) \times N_A}{100 \times 10^{18} \times 122} =$$

8.9 atoms of metals from Group VIb/$nm^2$ of catalyst

The second catalyst can advantageously also contain at least one dopant chosen from boron, fluorine and a mixture of boron and fluorine. When this dopant is present, its content is as described for the first catalyst.

The pore volume of the second catalyst is generally of between 0.1 $cm^3/g$ and 1.5 $cm^3/g$, preferably of between 0.15 $cm^3/g$ and 1.1 $cm^3/g$. The total pore volume is measured by mercury porosimetry according to Standard ASTM D4284 with a wetting angle of 140°, as described in the work by Rouquerol F., Rouquerol J. and Singh K., *Adsorption by Powders & Porous Solids: Principle, Methodology and Applications*, Academic Press, 1999, for example by means of an Autopore III™ model machine of the Micromeritics™ brand.

The second catalyst is characterized by a specific surface of between 5 and 400 $m^2/g$, preferably of between 10 and 350 $m^2/g$, preferably of between 40 and 350 $m^2/g$, very preferably of between 50 and 300 $m^2/g$. The specific surface is determined in the present invention by the BET method according to Standard ASTM D3663, which method is described in the same work cited above.

The support of the second catalyst comprises, and preferably consists of, an alumina or a silica or a silica-alumina. The support is a support as described for the first catalyst. It can additionally comprise a zeolite as described for the first catalyst. It can be identical to or different from the support of the first catalyst.

The first catalyst according to the invention can additionally comprise an organic compound or a group of organic compounds, the nature and the amounts of which used are described in the part for the first catalyst. When the two catalysts comprise one or more organic compounds, the latter can be identical or different.

According to a preferred embodiment, the hydrotreating process employs a sequence of a first hydrotreating reaction section containing the first catalyst based on nickel and molybdenum in the presence of phosphorus and of a second hydrotreating reaction section containing the second catalyst based on nickel, molybdenum and tungsten in the presence of phosphorus, said first hydrotreating reaction section containing the first catalyst occupying a volume V1 and said second hydrotreating reaction section containing the second catalyst occupying a volume V2, the distribution of the volumes V1/V2 being of between 50% vol/50% vol and 90% vol/10% vol respectively of said first and second hydrotreating reaction section, said second catalyst being characterized by:

- a content of nickel, measured in the NiO form, of between 3% and 4% by weight, with respect to the total weight of the catalyst, preferably between 3.1% and 3.9% by weight and more preferably between 3.2% and 3.8% by weight;
- a content of molybdenum, measured in the MoO$_3$ form, of between 2% and 9% by weight, with respect to the total weight of the catalyst, preferably between 2% and 4% by weight, preferably between 2.2% and 3.8% by weight and more preferably between 2.5% and 3.5% by weight;
- a content of tungsten, measured in the WO$_3$ form, of between 29% and 40% by weight, with respect to the total weight of the catalyst, preferably between 34% and 40% by weight, preferably between 35% and 39.9% by weight and more preferably between 36% and 39% by weight;
- a content of phosphorus in said catalyst, measured in the P$_2$O$_5$ form, preferably of between 3% and 4% by weight, with respect to the total weight of the catalyst, preferably between 3.1% and 3.9% by weight and very preferably between 3.2% and 3.8% by weight;
- a WO$_3$/MoO$_3$ molar ratio of between 2 and 12.4 mol/mol, preferably 5.3 and 12.4 mol/mol, preferably of between 5.7 and 11.1 mol/mol and more preferably still of between 6.4 and 9.7 mol/mol;
- a NiO/(WO$_3$+MoO$_3$) molar ratio of between 0.20 and 0.33 mol/mol, preferably of between 0.21 and 0.31 mol/mol and more preferably still of between 0.22 and 0.30 mol/mol;
- a P$_2$O$_5$/(WO$_3$+MoO$_3$) molar ratio of between 0.21 and 0.34 mol/mol, preferably of between 0.22 and 0.33 mol/mol and more preferably still of between 0.23 and 0.32 mol/mol.

According to this preferred embodiment, the first and/or the second catalyst additionally comprises at least one oxygen- and/or nitrogen- and/or sulfur-containing organic compound.

According to this embodiment, the organic compound is preferably chosen from γ-valerolactone, 2-acetylbutyrolactone, triethylene glycol, diethylene glycol, ethylene glycol, ethylenediaminetetraacetic acid (EDTA), maleic acid, malonic acid, citric acid, acetic acid, gluconic acid, glucose, fructose, sucrose, sorbitol, xylitol, γ-ketovaleric acid, a di(C$_1$-C$_4$ alkyl) succinate and more particularly dimethyl succinate, dimethylformamide, 1-methyl-2-pyrrolidinone, propylene carbonate, 2-methoxyethyl 3-oxobutanoate, bicine, tricine, 2-furaldehyde (also known under the name furfural), 5-hydroxymethylfurfural (also known under the name 5-(hydroxymethyl)-2-furaldehyde or 5-HMF), 2-acetylfuran, 5-methyl-2-furaldehyde, ascorbic acid, butyl lactate, ethyl lactate, butyl butyryllactate, ethyl 3-hydroxybutanoate, ethyl 3-ethoxypropanoate, 2-ethoxyethyl acetate, 2-butoxyethyl acetate, 2-hydroxyethyl acrylate, 1-vinyl-2-pyrrolidinone, 1,3-dimethyl-2-imidazolidinone, 1,5-pentanediol, 1-(2-hydroxyethyl)-2-pyrrolidinone, 1-(2-hydroxyethyl)-2,5-pyrrolidinedione, 5-methyl-2(3H)-furanone, 1-methyl-2-piperidinone, 4-aminobutanoic acid, butyl glycolate, ethyl 2-mercaptopropanoate, ethyl 4-oxopentanoate, diethyl maleate, dimethyl maleate, dimethyl fumarate, diethyl fumarate, dimethyl adipate and dimethyl 3-oxoglutarate.

Preparation Process

The first and the second catalysts can be prepared according to any method for the preparation of a supported catalyst known to a person skilled in the art.

The first and the second catalysts can be prepared according to a preparation process comprising the following stages:
i) a nickel precursor, a molybdenum precursor, a tungsten precursor, when tungsten is present, and phosphorus, when it is present, are brought into contact with a support based on alumina or silica or silica-alumina, so as to obtain a catalyst precursor,
ii) said catalyst precursor resulting from stage i) is dried at a temperature of less than 200° C.,
iii) optionally, the catalyst precursor obtained in stage ii) is calcined at a temperature of between 200° C. and 550° C.,
iv) optionally, the catalyst obtained in stage ii) or in stage iii) is sulfided.

During the contacting operation of stage i), the first and the second catalysts can be prepared by impregnation of the metals and of phosphorus onto the support selected. The impregnation can, for example, be carried out according to the method known to a person skilled in the art under the terminology of dry impregnation, in which just the amount of desired elements in the form of soluble salts is introduced into the chosen solvent, for example demineralized water, so as to fill as exactly as possible the porosity of the support.

The precursors of the active phase can be introduced simultaneously or successively. The impregnation of each precursor can advantageously be carried out at least twice. The different precursors can thus advantageously be impregnated successively with a different impregnation and maturation time. One of the precursors can also be impregnated several times.

Preferably, the precursors of the active phase are introduced simultaneously.

The nickel precursors which can be used are advantageously chosen from nickel oxides, hydroxides, hydroxycarbonates, carbonates and nitrates; for example, nickel hydroxycarbonate, nickel carbonate or nickel hydroxide are preferably used.

The molybdenum precursors which can be used are well known to a person skilled in the art. For example, use may be made, among the sources of molybdenum, of the oxides and hydroxides, molybdic acids and their salts, in particular the ammonium salts, such as ammonium molybdate or ammonium heptamolybdate, phosphomolybdic acid (H$_3$PMo$_{12}$O$_{40}$) and their salts, and optionally silicomolybdic acid (H$_4$SiMo$_{12}$O$_{40}$) and its salts. The sources of molybdenum can also be heteropolycompounds of Keggin, lacunary Keggin, substituted Keggin, Dawson, Anderson or Strandberg type, for example. Use is preferably made of molybdenum trioxide and the heteropolyanions of Strandberg, Keggin, lacunary Keggin or substituted Keggin type.

The tungsten precursors which can be used are also well known to a person skilled in the art. For example, use may be made, among the sources of tungsten, of the oxides and hydroxides, tungstic acids and their salts, in particular the ammonium salts such as ammonium tungstate or ammonium metatungstate, phosphotungstic acid and their salts, and optionally silicotungstic acid ($H_4SiW_{12}O_{40}$) and its salts. The sources of tungsten can also be heteropolycompounds of Keggin, lacunary Keggin, substituted Keggin or Dawson type, for example. Use is preferably made of the oxides and the ammonium salts, such as ammonium metatungstate, or the heteropolyanions of Keggin, lacunary Keggin or substituted Keggin type.

The phosphorus can be introduced completely or partially by impregnation. Preferably, it is introduced by an impregnation, preferably a dry impregnation, using a solution containing the nickel, molybdenum and tungsten precursors.

Said phosphorous can advantageously be introduced alone or as a mixture with the active phase, and this can be done during any of the stages of impregnation of the hydrogenating function if the latter is introduced a number of times. Said phosphorus can also be introduced, in all or part, during the impregnation of an oxygen- and/or nitrogen- and/or sulfur-containing organic compound, if the latter is introduced separately from the hydrogenating function (case of the post- and preimpregnation which are described subsequently). It can also be introduced from the synthesis of the support, at any stage of the synthesis of the latter. It can thus be introduced before, during or after the kneading of the chosen alumina gel matrix, such as, for example and preferably, aluminum oxyhydroxide (boehmite), which is the alumina precursor.

The preferred phosphorus precursor is orthophosphoric acid $H_3PO_4$ but its salts and esters, such as ammonium phosphates, are also suitable. The phosphorus can also be introduced at the same time as the element(s) from Group VIb in the form of Keggin, lacunary Keggin, substituted Keggin or Strandberg-type heteropolyanions.

Any impregnation solution described in the present invention may comprise any polar solvent known to a person skilled in the art. Said polar solvent used is advantageously chosen from the group formed by methanol, ethanol, water, phenol and cyclohexanol, taken alone or as a mixture. Preferably, a polar protic solvent is used. A list of the common polar solvents and also their dielectric constant can be found in the book "Solvents and Solvent Effects in Organic Chemistry", C. Reichardt, Wiley-VCH, 3rd edition, 2003, pages 472-474. Very preferably, the solvent used is water or ethanol and particularly preferably the solvent is water. In one possible embodiment, the solvent can be absent from the impregnation solution.

When the first or the second catalyst additionally comprises a dopant chosen from boron, fluorine or a mixture of boron and fluorine, the introduction of this (these) dopant(s) can be carried out in the same way as the introduction of phosphorus described above at various stages of the preparation and in various ways.

The boron precursors can be boric acid, orthoboric acid $H_3BO_3$, ammonium diborate or pentaborate, boron oxide or boric esters. The boron can be introduced, for example, by a solution of boric acid in a water/alcohol mixture or in a water/ethanolamine mixture. Preferably, the boron precursor, if boron is introduced, is orthoboric acid.

The fluorine precursors which can be used are well known to a person skilled in the art. For example, fluoride anions can be introduced in the form of hydrofluoric acid or its salts. These salts are formed with alkali metals, ammonium or an organic compound. In the latter case, the salt is advantageously formed in the reaction mixture by reaction between the organic compound and hydrofluoric acid. The fluorine can be introduced, for example, by impregnation of an aqueous solution of hydrofluoric acid or of ammonium fluoride or of ammonium difluoride.

When the first or the second catalyst additionally comprises an oxygen- and/or nitrogen- and/or sulfur-containing organic compound, the latter is introduced before the drying stage ii). The organic compound is generally introduced by impregnation, in the presence or absence of the active phase and phosphorus and in the presence or absence of a solvent.

The introduction of the organic compound comprises several embodiments which differ in particular in the moment of the introduction of the organic compound with respect to the introduction of the metals. It can be carried out either at the same time as the impregnation of the metals (co-impregnation), or after the impregnation of the metals (post-impregnation), or finally before the impregnation of the metals (pre-impregnation), in particular during the preparation of the support, and preferentially during the shaping or by impregnation on a preformed support. Each embodiment, taken alone or in combination, can proceed in one or more stages.

Furthermore, the contacting stage can combine at least two embodiments, for example the co-impregnation and the post-impregnation. According to an alternative embodiment, the contacting operation according to stage i) combines at least two contacting embodiments, for example the co-impregnation of the active phase and phosphorus with an organic compound, followed by drying at a temperature of less than 200° C., then by a post-impregnation of an organic compound which can be identical to or different from that used for the co-impregnation. Each embodiment, taken alone or in combination, can proceed in one or more stages.

The organic compound(s) is (are) advantageously introduced into an impregnation solution which, depending on the preparation embodiment, can be the same solution as or a different solution from that containing the precursors of the active phase and phosphorus, in an amount corresponding:

to a molar ratio of the organic compound to the sum of the element(s) from Group VIb of the catalyst precursors (Mo for the first catalyst or (Mo and W) for the second catalyst) of between 0.01 and 5 mol/mol, preferably of between 0.05 and 3 mol/mol, preferably of between 0.05 and 1.5 mol/mol and very preferably of between 0.1 and 1.2 mol/mol, calculated on the basis of the components introduced into the impregnation solution(s), and to a molar ratio of the organic compound to nickel of between 0.02 and 17 mol/mol, preferably of between 0.1 and 10 mol/mol, preferably of between 0.15 and 8 mol/mol and very preferably of between 0.6 and 5 mol/mol, calculated on the basis of the components introduced into the impregnation solution(s).

When several organic compounds are present, the different molar ratios apply for each of the organic compounds present.

Advantageously, after each impregnation stage, the impregnated support is left to mature. Maturation makes it possible for the impregnation solution to homogeneously disperse within the support.

Any maturation stage described in the present invention is advantageously carried out at atmospheric pressure, in a water-saturated atmosphere and at a temperature of between 17° C. and 50° C., and preferably at ambient temperature. Generally, a maturation time of between ten minutes and forty-eight hours and preferably of between thirty minutes and five hours is sufficient. Longer periods of time are not ruled out but do not necessarily provide any improvement.

In accordance with stage ii) of the preparation process according to the invention, the catalyst precursor obtained in stage i), which is optionally matured, is subjected to a drying stage at a temperature of less than 200° C., preferably of between 50° C. and 180° C., in a preferred way between 70° C. and 150° C. and in a very preferred way between 75° C. and 130° C.

The drying stage is advantageously carried out by any technique known to a person skilled in the art. It is advantageously carried out at atmospheric pressure or at reduced pressure, and preferably at atmospheric pressure. It is advantageously carried out in a traversed bed using hot air or any other hot gas. Preferably, when the drying is carried out in a fixed bed, the gas used is either air or an inert gas, such as argon or nitrogen. Very preferably, the drying is carried out in a traversed bed in the presence of nitrogen and/or air. Preferably, the drying stage has a short duration of between 5 minutes and 4 hours, preferably between 30 minutes and 4 hours and very preferably between 1 hour and 3 hours. When an organic compound is present, the drying is then carried out so as preferentially to retain at least 30% of the organic compound introduced; preferably, this amount is greater than 50% and more preferably still greater than 70%, calculated on the basis of the carbon remaining on the catalyst. On conclusion of the drying stage b), a dried catalyst is obtained. Optionally, the drying stage ii) can be followed by a calcination stage iii).

According to this alternative form, on conclusion of the drying stage ii), a calcination stage c) is carried out at a temperature of between 200° C. and 600° C., preferably of between 250° C. and 550° C., under an inert atmosphere (for example nitrogen) or under an atmosphere containing oxygen (for example air). The duration of this heat treatment is generally of between 0.5 hour and 16 hours, preferably between 1 hour and 5 hours. After this treatment, the active phase is thus found in the oxide form; the heteropolyanions are thus converted into oxides. Likewise, the catalyst no longer contains or contains very little organic compound when it has been introduced. However, the introduction of the organic compound during its preparation has made it possible to increase the dispersion of the active phase, thus leading to a more active catalyst.

When an organic compound is present, the catalyst is preferably not subjected to a calcination. The term "calcination" is understood here to mean a heat treatment under a gas containing air or oxygen at a temperature of greater than or equal to 200° C.

However, the catalyst precursor can undergo a calcination stage before the introduction of the organic compound, in particular after the impregnation of the active phase, and phosphorus.

The first or the second catalyst can be a fresh catalyst, that is to say a catalyst which has not been used as catalyst previously in a catalytic unit and in particular in hydrotreating.

The first or the second catalyst according to the invention can also be a regenerated and/or rejuvenated catalyst. A regenerated and/or rejuvenated catalyst is understood to mean a catalyst which has been used as catalyst in a catalytic unit and in particular in hydrotreating and/or hydrocracking and which has been subjected to at least one stage of partial or complete removal of coke, for example by calcination (regeneration). The regeneration can be carried out by any means known to a person skilled in the art. The regeneration is generally carried out by calcination at temperatures of between 350° C. and 550° C., and generally between 400° C. and 520° C., or between 420° C. and 520° C., or between 450° C. and 520° C., temperatures of less than 500° C. often being advantageous.

When the regenerated catalyst no longer comprises enough active phase and/or phosphorus, or when it exhibits a ratio or ratios outside the preferred ratios described above, the regenerated catalyst can be rejuvenated by introducing one or more precursors of the active phase and/or phosphorus into the regenerated catalyst. It is also possible to introduce at least one organic compound simultaneously with the metals and phosphorus or separately. The organic compound introduced may or may not be identical to the organic compound of the fresh catalyst when this catalyst comprised such an organic compound. The operating conditions described above concerning the maturation, the drying and the optional calcination and the optional sulfidation are, of course, applicable in the context of this last embodiment.

Before its use in the hydrotreating reaction, it is advantageous to transform the first and/or the second catalyst into a sulfided catalyst in order to form its active entity. This activation or sulfidation stage is carried out by methods well known to a person skilled in the art, and advantageously under a sulfo-reductive atmosphere in the presence of hydrogen and hydrogen sulfide.

According to an alternative form, the first or the second catalyst is advantageously subjected to a sulfidation stage after drying stage ii) or the optional calcination stage iii). Said catalyst is advantageously sulfided ex situ or in situ. The sulfiding agents are $H_2S$ gas, elemental sulfur, $CS_2$, mercaptans, sulfides and/or polysulfides, hydrocarbon cuts having a boiling point of less than 400° C. containing sulfur compounds or any other sulfur-containing compound used for the activation of hydrocarbon feedstocks with a view to sulfiding the catalyst. Said sulfur-containing compounds are advantageously chosen from alkyl disulfides, such as, for example, dimethyl disulfide (DMDS), alkyl sulfides, such as, for example, dimethyl sulfide, thiols, such as, for example, n-butyl mercaptan (or 1-butanethiol), and polysulfide compounds of tert-nonyl polysulfide type. The catalyst can also be sulfided by the sulfur contained in the feedstock to be desulfurized. Preferably, the catalyst is sulfided in situ in the presence of a sulfiding agent and of a hydrocarbon feedstock. Very preferably, the catalyst is sulfided in situ in the presence of a hydrocarbon feedstock additivated with dimethyl disulfide.

Application of the Process According to the Invention in a ULSD Process of a Gas Oil Cut According to a first embodiment, said hydrotreating process according to the invention is a process for the hydrotreating, and in particular for the hydrodesulfurization (HDS), of a gas oil cut carried out in the presence of said sequence of catalysts. Said hydrotreating process according to the invention is targeted at removing the sulfur-based compounds present in said gas oil cut so as to meet the environmental standards in force, namely a permitted sulfur content of up to 10 ppm. It also makes it possible to significantly reduce the contents of aromatics and of nitrogen of the gas oil cut to be hydrotreated.

Said gas oil cut to be hydrotreated according to the process of the invention contains from 0.02% to 5.0% by weight of sulfur. It advantageously results from straight-run distillation (or straight-run gas oil), from a coking unit, from a visbreaking unit, from a steam cracking unit, from a unit for the hydrotreating and/or hydrocracking of heavier feedstocks and/or from a catalytic cracking unit (fluid catalytic cracking). Said gas oil cut preferentially exhibits at least 90% of compounds, the boiling point of which is of between 250° C. and 400° C. at atmospheric pressure.

The process for the hydrotreating of said gas oil cut according to the invention is carried out under the following operating conditions: a temperature of between 200° C. and 400° C., preferentially between 300° C. and 380° C., a total pressure of between 2 MPa and 10 MPa and more preferentially between 3 MPa and 8 MPa, with a ratio of the volume of hydrogen per volume of hydrocarbon feedstock, expressed as volume of hydrogen, measured under standard temperature and pressure conditions, per volume of liquid feedstock, of between 100 and 600 liters per liter and more preferentially between 200 and 400 liters per liter, and an hourly space velocity (HSV) of between 0.5 and 10 $h^{-1}$, preferentially between 0.7 and 8 $h^{-1}$.

The HSV corresponds to the inverse of the contact time expressed in hours and is defined by the ratio of the flow rate by volume of liquid hydrocarbon feedstock per volume of catalyst charged to the reaction unit implementing the hydrotreating process according to the invention. The reaction unit implementing the process for hydrotreating said gas oil cut according to the invention is preferentially operated as a fixed bed.

Application of the Process According to the Invention in a Hydrocracking Process According to a second alternative form, the hydrotreating process according to the invention is advantageously carried out as pretreatment in a hydrocracking process and more particularly in a "single-stage" hydrocracking process or in a "two-stage" hydrocracking process. The hydrocracking process makes it possible to convert petroleum fractions, in particular vacuum distillates (VDs), into lighter and more upgradable products (gasoline, middle distillates). The hydrotreating process according to the invention is targeted at removing sulfur-based, nitrogen-based or aromatic compounds present in said vacuum distillate cut.

Highly varied feedstocks can be treated. Generally, they contain at least 20% by volume and often at least 80% by volume of compounds boiling above 340° C. at atmospheric pressure. The feedstock can, for example, be vacuum distillates and also feedstocks originating from units for the extraction of aromatics from lubricating oil bases or resulting from the solvent dewaxing of lubricating oil bases, and/or deasphalted oils, or the feedstock can be a deasphalted oil or paraffins resulting from the Fischer-Tropsch process, or any mixture of the abovementioned feedstocks. In general, the feedstocks have a T5 boiling point of greater than 340° C. at atmospheric pressure and better still of greater than 370° C. at atmospheric pressure, that is to say that 95% of the compounds present in the feedstock have a boiling point of greater than 340° C. and better still of greater than 370° C. The nitrogen content of the feedstocks treated in the processes according to the invention is usually greater than 200 ppm by weight, preferably of between 500 and 10 000 ppm by weight. The sulfur content of the feedstocks treated in the processes according to the invention is usually of between 0.01% and 5.0% by weight. The feedstock can optionally contain metals (for example nickel and vanadium). The content of asphaltenes is generally less than 3000 ppm by weight.

A "single-stage" hydrocracking process comprises, firstly and generally, an exhaustive hydrotreating, the aim of which is to carry out an exhaustive HDN, exhaustive HDS and exhaustive HDA of the feedstock before the latter is sent over the hydrocracking catalyst(s). Said single-stage hydrocracking process is particularly advantageous when said hydrocracking catalyst(s) comprise(s) a support comprising zeolite crystals. This exhaustive hydrotreating of the feedstock results in only a limited conversion of the feedstock, into lighter fractions, which remains insufficient and thus has to be completed over the more active hydrocracking catalyst(s). However, it should be noted that no separation of the effluents occurs between the different catalytic beds: all of the effluent at the outlet of the hydrotreating catalytic bed is injected over the catalytic bed(s) containing said hydrocracking catalyst(s) and then the products formed are separated. This version of the hydrocracking has an alternative form which exhibits a recycling of the unconverted fraction to at least one of the hydrocracking catalytic beds for the purpose of a more exhaustive conversion of the feedstock. Advantageously, the hydrotreating process according to the invention comprising the specific sequence according to the invention is carried out upstream of a hydrocracking catalyst in a single-stage hydrocracking process. In addition, it makes it possible to limit the nitrogen content on conclusion of the pretreatment stage in order to protect the hydrocracking catalyst based on zeolite which is very sensitive to nitrogen.

A "two-stage" hydrocracking process comprises a first stage, the objective of which is, as in the "single-stage" process, to carry out the hydrotreating of the feedstock but also to achieve a conversion of the latter of the order generally of 40% to 60%. The effluent resulting from the first stage is subsequently subjected to a separation, generally by distillation, most often referred to as intermediate separation, the objective of which is to separate the conversion products from the unconverted fraction. In the second stage of the two-stage hydrocracking process according to the invention, only the fraction of the feedstock not converted during the first stage is treated. This separation makes it possible for the two-stage hydrocracking process according to the invention to be more selective for middle distillate (kerosene+diesel) than the single-stage process according to the invention. This is because the intermediate separation of the conversion products prevents them from "overcracking" to give naphtha and gas in the second stage over the hydrocracking catalyst(s). Furthermore, it should be noted that the unconverted fraction of the feedstock treated in the second stage generally contains very low contents of $NH_3$ and also of organic nitrogen-based compounds, generally less than 20 ppm by weight, indeed even less than 10 ppm by weight.

Said first stage is carried out in the presence of the specific sequence of catalysts according to the invention and of a hydrocracking catalyst in order to carry out a hydrotreating and a conversion of the order generally of 40% to 60%. The catalytic beds of the specific sequence of catalysts according to the invention are advantageously found upstream of the hydrocracking catalyst. Said second stage is generally carried out in the presence of a hydrocracking catalyst different in composition from that present for the implementation of said first stage.

The hydrocracking processes are generally carried out at a temperature of between 250° C. and 480° C., advantageously of between 320° C. and 450° C., preferably between 330° C. and 435° C., under a pressure of between 2 and 25 MPa, preferably between 3 and 20 MPa, the hourly space velocity of the feedstock with respect to the volume of each catalyst (HSV) is advantageously of between 0.1 and 40 $h^{-1}$, preferably between 0.2 and 12 $h^{-1}$, very preferably between 0.4 and 6 h 1, and the hydrogen/feedstock ratio, expressed as standard cubic meters ($Sm^3$) of hydrogen per cubic meter ($m^3$) of hydrocarbon feedstock, is advantageously of between 80 SI/l and 5000 SI/l, preferably between 100 and 2000 SI/l. The processes for the hydrocracking of vacuum distillates cover the pressure and conversion ranges extending from mild hydrocracking to high-pressure hydrocracking. Mild hydrocracking is understood to mean a hydrocracking which results in moderate conversions, generally of less than 40%, and which operates at low pressure, preferably between 2 MPa and 6 MPa.

The hydrocracking catalysts are of the bifunctional type: they combine an acid function with a hydro/dehydrogenating function. The acid function is provided by porous supports, the surfaces of which generally vary from 150 to 800 $m^2 \cdot g^{-1}$ and which exhibit a surface acidity, such as halogenated (in particular chlorinated or fluorinated) aluminas, combinations of boron and aluminum oxides, amorphous or crystalline mesoporous aluminosilicates and zeolites dispersed in an oxide binder. The hydro/dehydrogenating function is provided by the presence of an active phase based on at least one metal from Group VIb and optionally at least one metal from Group VIII of the Periodic Table of the Elements. The commonest formulations are of nickel-molybdenum (NiMo) and nickel-tungsten (NiW) type and more rarely of cobalt-molybdenum (CoMo) type. After preparation, the hydro/dehydrogenating function often exists in the oxide form. The usual methods resulting in the formation of the hydro/dehydrogenating phase of the hydrocracking catalysts consist of a deposit of molecular precursor(s) of at least one metal from Group VIb and optionally at least one metal from Group VIII on an acid oxide support by the "dry impregnation" technique, followed by the maturation, drying and calcination stages, resulting in the formation of the oxidized form of said metal(s) employed. As the active and stable form for hydrocracking processes is the sulfided form, these catalysts have to undergo a sulfidation stage. The latter can be carried out in the unit of the associated process (reference is then made to in situ sulfidation) or prior to the charging of the catalyst to the unit (reference is then made to ex situ sulfidation).

Application of the Process According to the Invention in an FCC Process

According to a third alternative form, the hydrotreating process according to the invention is advantageously carried out as pretreatment in a fluidized bed catalytic cracking (or FCC for fluid catalytic cracking) process. The FCC process can be carried out in a conventional way known to a person skilled in the art under suitable cracking conditions for the purpose of producing hydrocarbon products of lower molecular weight. For example, a summary description of catalytic cracking (the first industrial use of which goes back to 1936 (Houdry process) or to 1942 for the use of a fluidized bed catalyst) will be found in Ullmann's Encyclopedia of Industrial Chemistry, Volume A 18, 1991, pages 61 to 64.

Use is usually made of a conventional catalyst comprising a matrix, optionally an additive and at least one zeolite in the FCC process. The amount of zeolite is variable but usually from 3% to 60% by weight, often from 6% to 50% by weight, and generally from 10% to 45% by weight, with respect to the weight of the catalyst. The zeolite is usually dispersed in the matrix. The amount of additive is usually from 0% to 30% by weight and often from 0% to 20% by weight, with respect to the weight of the catalyst. The amount of matrix represents the complement to 100% by weight. The additive is generally chosen from the group formed by the oxides of metals from Group IIa of the Periodic Table of the Elements, such as, for example, magnesium oxide or calcium oxide, rare-earth metal oxides and titanates of metals from Group IIa. The matrix is generally a silica, an alumina, a silica-alumina, a silica-magnesia, a clay or a mixture of two or more of these products. The most commonly used zeolite is zeolite Y.

The cracking is carried out in a substantially vertical reactor, either in upward mode (riser) or in downward mode (dropper). The choice of the catalyst and of the operating conditions depends on the products desired as a function of the feedstock treated, as is, for example, described in the paper by M. Marcilly, pages 990-991, published in the revue de l'institut français du pétrole [Review of the French Institute of Petroleum], November-December 1975, pages 969-1006. The operation is usually carried out at a temperature of 450° C. to 600° C. and residence times in the reactor of less than 1 minute, often from 0.1 to 50 seconds.

The pretreatment makes it possible in addition to limit the nitrogen content on conclusion of the pretreatment stage in order to protect the catalytic cracking catalyst based on zeolite which is very sensitive to nitrogen.

EXAMPLES

The examples which follow demonstrate the significant gain in HDA and HDN activity using the specific sequence according to the invention.

Examples 1 to 3 describe the preparation of catalysts $C_1$ to $C_3$. The final composition of each catalyst in metals and in phosphorus, expressed in the form of oxides and with respect to the weight of the catalyst, and also the $WO_3/MoO_3$, $NiO/(WO_3+MoO_3)$ and $P_2O_5/(WO_3+MoO_3)$ ratios, appear in table 1 below.

Examples 4 to 7 describe the evaluation in hydrogenation of aromatics (HDA) and in hydrodenitrogenation (HDN) of gas oil of different sequences of catalysts C1, C2 and C3.

Example 1: Preparation of the Catalyst NiMoP on Alumina C1

Nickel, molybdenum and phosphorus are added to 100 g of an alumina support A1 exhibiting a loss on ignition of 4.9% by weight, a BET specific surface of 230 $m^2/g$, a pore volume, measured by mercury porosimetry, of 0.78 ml/g and a mean pore diameter of 11.5 nm, defined as the median diameter by volume by mercury porosimetry, and which is provided in the "extrudate" form. The support A1 exhibits a water uptake volume of 0.77 ml/g. The impregnation solution is prepared by dissolution at 90° C. of 37.41 g of molybdenum oxide (Merck™, purity >99.5% by weight), of 11.96 g of nickel hydroxycarbonate (Merck™, purity 99.9% by weight) and of 14.53 g of an orthophosphoric acid solution (Merck™, 85% by weight in water) in 67.2 ml of distilled water. After dry impregnation, the extrudates are left to mature in a water-saturated atmosphere at ambient temperature for 24 h and then they are dried at 90° C. for 16 h. The dried impregnated support of the catalyst C1 is subsequently additivated by dry impregnation with a solution containing a mixture of dimethyl succinate (DMSU) and acetic acid (with a purity of 75%). The molar ratios are as follows: DMSU/Mo=0.85 mol/mol, DMSU/acetic acid=0.5 mol/mol. The catalyst again undergoes a stage of maturation at 20° C. for 3 h under air and is then dried in an oven of traversed bed type at 120° C. for 3 h. The dried catalyst thus obtained is denoted C1. The final composition of the catalyst C1, expressed in the form of oxides, is then as follows: $MoO_3$=25.1+/−0.2 (% by weight), NiO=5.1+/−0.1 (% by weight) and $P_2O_5$=6.0+/−0.1 (% by weight).

Example 2: Preparation of the Catalyst NiMoWP on Alumina C2

Nickel, molybdenum, tungsten and phosphorus are added to the same support A1 as presented in example 1. The impregnation solution is prepared by dissolution at 90° C. of molybdenum oxide (Merck™, purity >99.5% by weight, 6.12 g), of ammonium metatungstate hydrate (Merck™, ≥85.0% by weight $WO_3$, 74.74 g), of nickel nitrate hexahydrate (Merck™, purity 99.999% by weight, 26.07 g) and of an orthophosphoric acid solution (Merck™, 85% by weight in water, 10.24 g) in 68.3 ml of distilled water. After dry impregnation of 100 g of support A1, the extrudates are left to mature in a water-saturated atmosphere at ambient temperature for 24 h and then they are dried at 90° C. for 16 hours. The dried catalyst thus obtained is denoted C2.

The final composition of the catalyst C2, expressed in the form of oxides, is then as follows:

$MoO_3$ = 3.4+/−0.1 (% by weight), $WO_3$ = 36.6+/−0.2 (% by weight), $NiO$ = 3.7+/−0.1 (% by weight) and $P_2O_5$ = 3.5+/−0.1 (% by weight).

Example 3: Preparation of the Catalyst NiMoWP on Alumina C3 by Postadditivation with an Organic Compound (Ascorbic Acid)

100 g of catalyst precursor C2 described above in example 2 and which is provided in the "extrudate" form are impregnated with an aqueous solution containing 28.78 g of ascorbic acid (Merck™, purity 100%) and the volume of which is equal to the pore volume of the catalyst precursor C2. The amounts involved are such that the amount of ascorbic acid is 0.5 mol per mole of molybdenum and mole of tungsten (corresponding to 1.9 mol per mole of nickel). The extrudates are left to mature in a water-saturated atmosphere at ambient temperature for 16 h. The catalyst precursor C3 is then dried at 120° C. for 2 hours to give the catalyst C3.

The final composition of the catalyst C3, expressed in the form of oxides, is then as follows:

$MoO_3$ = 3.4+/−0.1 (% by weight), $WO_3$ = 36.6+/−0.2 (% by weight), $NiO$ = 3.7+/−0.1 (% by weight) and $P_2O_5$ = 3.5+/−0.1 (% by weight).

Examples 4 to 7: Evaluation in Hydrogenation of Aromatics (HDA) and Hydrodenitrogenation (HDN) of Gas Oil of Sequences of Catalysts C1, C2 and C3

The sequences of catalysts taken from the catalysts C1, C2 and C3 were tested in hydrogenation of aromatics (HDA) of gas oil.

The feedstock is a mixture of 30% by volume of gas oil resulting from atmospheric distillation (also referred to as straight-run distillation) and 70% by volume of light gas oil resulting from a catalytic cracking unit (also known as LCO for Light Cycle Oil). The characteristics of the test feedstock used are as follows: density at 15° C.=0.8994 g/cm³ (NF EN ISO 12185), refractive index at 20° C.=1.5143 (ASTM D1218-12), sulfur content=0.38% by weight, nitrogen content=0.05% by weight.

Simulated distillation (ASTM D2887):
 IP: 133° C.;
 10%: 223° C.;
 50%: 285° C.;
 90%: 357° C.;
 FP: 419° C.

The test is carried out in an isothermal pilot reactor having a traversed fixed bed, the fluids circulating from the bottom upward. The reactor comprises two catalytic regions making it possible to evaluate different sequences of the catalysts C1, C2 and C3. The feedstock first traverses the first region charged with the first catalyst and then the second region charged with the second catalyst.

According to example 4 (in accordance with the invention), the first region is charged with the catalyst C1 (75% of the volume) and then the second with the catalyst C2 (25% of the volume).

According to example 5 (in accordance with the invention), the first region is charged with the catalyst C1 (75% of the volume) and then the second with the catalyst C3 (25% of the volume).

According to example 6 (not in accordance with the invention), the first region is charged with the catalyst C1 (40% of the volume) and then the second with the catalyst C2 (60% of the volume).

According to example 7 (not in accordance with the invention), the first region is charged with the catalyst C1 (95% of the volume) and then the second with the catalyst C2 (5% of the volume).

The catalysts are sulfided beforehand in situ at 350° C. in the reactor under pressure by means of an atmospheric (straight-run) distillation gas oil feedstock (density at 15° C.=0.8491 g/cm³ (NF EN ISO 12185) and initial sulfur content=0.42% by weight), to which 2% by weight of dimethyl disulfide are added.

The catalytic tests were carried out under the following operating conditions: a total pressure of 8 MPa, a total

TABLE 1

Composition of the catalysts C1, C2 and C3

| Catalyst | % by weight NiO | % by weight $MoO_3$ | % by weight $WO_3$ | % by weight $P_2O_5$ | $WO_3/MoO_3$ (mol/mol) | $NiO/(WO_3 + MoO_3)$ (mol/mol) | $P_2O_5/(WO_3 + MoO_3)$ (mol/mol) |
|---|---|---|---|---|---|---|---|
| C1 | 5.1 | 25.1 | — | 6.0 | — | 0.27 | 0.27 |
| C2 | 3.7 | 3.4 | 36.6 | 3.5 | 6.7 | 0.27 | 0.27 |
| C3 | 3.7 | 3.4 | 36.6 | 3.5 | 6.7 | 0.27 | 0.27 | volume of the two catalytic regions of 4 cm³, a temperature of 330° C., with a hydrogen flow rate of 3.0 l/h and with a feedstock flow rate of 4.5 cm³/h.

The characteristics of the effluents are analysed: density at 15° C. (NF EN ISO 12185), refractive index at 20° C. (ASTM D1218-12), simulated distillation (ASTM D2887), sulfur content and nitrogen content. The residual contents of aromatic carbon are calculated by the n-d-M method (ASTM D3238). The degree of hydrogenation of aromatics is calculated as the ratio of the content of aromatic carbon in the feedstock, from which that of the effluents is subtracted, to that of the test feedstock. The degree of hydrodenitrogenation is calculated as the ratio of the content of nitrogen in the feedstock, from which that of the effluents is subtracted, to that of the test feedstock.

The catalytic performance qualities of the sequences of catalysts tested are given in table 2. They are expressed as relative volume activity (RVA) with respect to the sequence 95% vol catalyst C1 (first region of the reactor)+5% vol catalyst C2 (second region of the reactor) chosen as reference (example 7), an order of 1.7 being assumed for the HDA reaction and an order of 1 for the HDN reaction.

Table 2 clearly shows the gain with regard to the catalytic effect contributed by the specific sequences according to the invention. This is because the sequences of catalysts according to the invention make it possible to significantly increase the volume activities in the hydrodearomatization (HDA) and hydrodenitrogenation (HDN) reaction of gas oils.

TABLE 2

HDA and HDN relative activities for the specific sequences according to the invention (examples 4 and 5) and not in accordance (examples 6 and 7)

| Example | Charging of catalyst(s) in the reactor (first region/second region) | RVA HDA | RVA HDN |
|---|---|---|---|
| 4 (according to the invention) | 75% vol catalyst C1 + 25% vol catalyst C2 | 110 | 104 |
| 5 (according to the invention) | 75% vol catalyst C1 + 25% vol catalyst C3 | 125 | 108 |
| 6 (not in accordance) | 40% vol catalyst C1 + 60% vol catalyst C2 | 96 | 91 |
| 7 (not in accordance) | 95% vol catalyst C1 + 5% vol catalyst C2 | 100 | 100 |

The invention claimed is:

1. A process for the hydrotreating of a hydrocarbon feedstock having a distillation range of between 150° C. and 600° C. at a temperature of between 180° C. and 450° C., a pressure of between 0.5 and 30 MPa, an hourly space velocity of between 0.1 and 20 h−1 and a hydrogen/feedstock ratio, expressed as volume of hydrogen, measured under standard temperature and pressure conditions, per volume of liquid feedstock, of between 50 l/l; and 5000 l/l, so as to obtain a hydrotreated effluent, said process comprising the following stages:
    a) a first hydrotreating stage carried out in a first hydrotreating reaction section, employing at least one catalytic bed comprising at least one first hydrotreating catalyst, said hydrotreating reaction section being fed by at least said hydrocarbon feedstock and a gas stream comprising hydrogen, said first catalyst comprising a support based on alumina or silica or silica-alumina and an active phase consisting of nickel and molybdenum, the first catalyst has a molybdenum content of between 5% and 40% by weight, expressed as $MoO_3$, with respect to the total weight of the catalyst, and a nickel content of between 1% and 10% by weight, expressed as NiO, with respect to the total weight of the catalyst, the first catalyst comprises phosphorus at a content of between 0.1% and 20% by weight, expressed as $P_2O_5$, with respect to the total weight of the catalyst,
    b) a second hydrotreating stage carried out in a second hydrotreating reaction section, employing at least one catalytic bed comprising at least one second hydrotreating catalyst, said hydrotreating reaction section being fed by at least a part of the effluent obtained in stage a), said second catalyst comprising a support based on alumina or silica or silica-alumina and an active phase consisting of nickel, molybdenum and tungsten, and phosphorus, wherein in the second catalyst:
    the content of nickel, measured in the NiO form, is between 3% and 4% by weight, with respect to the total weight of the catalyst,
    the content of molybdenum, measured in the $MoO_3$ form, is between 2% and 9% by weight, with respect to the total weight of the catalyst,
    the content of tungsten, measured in the $WO_3$ form, is between 29% and 40% by weight, with respect to the total weight of the catalyst,
    the content of phosphorus, measured in the $P_2O_5$ form, is between 3% and 4% by weight, with respect to the total weight of the catalyst,
    the molar ratio $WO_3/MoO_3$ is between 2 and 12.4 mol/mol,
    the molar ratio $NiO/(WO_3+MoO_3)$ is between 0.20 and 0.33 mol/mol,
    the molar ratio $P_2O_5/(WO_3+MoO3)$ is between 0.21 and 0.34 mol/mol, and wherein said first hydrotreating reaction section containing the first catalyst occupying a volume V1 and said second hydrotreating reaction section containing the second catalyst occupying a volume V2, the distribution of the volumes V1/V2 being of between 50% vol/50% vol and 90% vol/10% vol respectively of said first and second hydrotreating reaction section.

2. The hydrotreating process as claimed in claim 1, in which the distribution of the volumes V1/V2 is between 60% vol/40% vol and 85% vol/15% vol respectively of said first and second hydrotreating reaction sections.

3. The hydrotreating process as claimed in claim 2, in which the distribution of the volumes V1/V2 is between 70% vol/30% vol and 80% vol/20% vol respectively of said first and second hydrotreating reaction sections.

4. The hydrotreating process as claimed in claim 1, in which the first and/or the second catalyst additionally contains an oxygen-and/or nitrogen-and/or sulfur-containing organic compound.

5. The hydrotreating process as claimed in claim 4, in which the organic compound comprises one or more chemical functional groups chosen from a carboxyl, alcohol, thiol, thioether, sulfone, sulfoxide, ether, aldehyde, ketone, ester, carbonate, amine, nitrile, imide, oxime, urea and/or amide functional groups or is a compound containing a furan ring or is a sugar.

6. The hydrotreating process as claimed in claim 5, in which the organic compound is chosen from γ-valerolactone, 2-acetylbutyrolactone, triethylene glycol, diethylene glycol, ethylene glycol, ethylenediaminetetraacetic acid (EDTA), maleic acid, malonic acid, citric acid, acetic acid, oxalic acid, gluconic acid, glucose, fructose, sucrose, sorbitol, xylitol, γ-ketovaleric acid, a di ($C_1$-$C_4$ alkyl) succinate and more particularly dimethyl succinate, dimethylformamide, 1-methyl-2-pyrrolidinone, propylene carbonate, 2-methoxyethyl 3-oxobutanoate, bicine, tricine, 2-furaldehyde (also known under the name furfural), 5-hydroxymethylfurfural, 2-acetylfuran, 5-methyl-2-furaldehyde, ascorbic acid, butyl lactate, ethyl lactate, butyl butyryllactate, ethyl 3-hydroxybutanoate, ethyl 3-ethoxypropanoate, 2-ethoxyethyl acetate, 2-butoxyethyl acetate, 2-hydroxyethyl acrylate, 1-vinyl-2-pyrrolidinone, 1,3-dimethyl-2-imidazolidinone, 1,5-pentanediol, 1-(2-hydroxyethyl)-2-pyrrolidinone, 1-(2-hydroxyethyl)-2,5-pyrrolidinedione, 5-methyl-2 (3H)-furanone, 1-methyl-2-piperidinone, 4-aminobutanoic 1 glycolate, ethyl 2-mercaptopropanoate, ethyl 4-oxopentanoate, diethyl maleate, dimethyl maleate, dimethyl fumarate, diethyl fumarate, dimethyl adipate and dimethyl 3-oxoglutarate.

7. The hydrotreating process as claimed in claim 4, in which the content of organic compound is between 1% and 30% by weight, with respect to the total weight of the catalyst.

8. The hydrotreating process as claimed in claim 1, in which the first and/or the second catalyst is at least partially sulfur-based.

9. The hydrotreating process as claimed in claim 1, which is a process for the hydrodesulfurization of a gas oil cut.

10. The hydrotreating process as claimed in claim 1, which is carried out as pretreatment in a fluidized bed catalytic cracking process.

11. The hydrotreating process as claimed in claim 1, which is carried out as pretreatment in a hydrocracking process.

* * * * *